United States Patent
Haberman

[45] Feb. 29, 1972

[54] UNDERWATER PLANING DEVICE

[72] Inventor: Sylvester Haberman, 8515 Forest Grove, Houston, Tex. 77055

[22] Filed: Mar. 2, 1970
[21] Appl. No.: 15,662

[52] U.S. Cl............................................114/235 B
[51] Int. Cl..............................................B63b 21/00
[58] Field of Search..................114/16 A, 16 R, 235 B

[56] References Cited

UNITED STATES PATENTS 3,144,848   8/1964   Knott et al...................114/235 B
3,477,401   11/1969  Hayama.......................114/16 R X

FOREIGN PATENTS OR APPLICATIONS 642,815    7/1962   Italy..............................114/16 A

*Primary Examiner*—Trygve M. Blix
*Attorney*—Duckworth and Hobby

[57] ABSTRACT

A device designed to travel through water at any of a plurality of depths by means of being towed from a conventional water craft wherein the device may be utilized as a sinker to maintain fishing tackle at a desired depth or as a transporter vehicle for transporting fluids, or the like, beneath the surface of the water. A towline is connected to the device such that the point of attachment of the towline to the device may be readily adjusted. The position of the attach point determines the angular orientation of the device relative to the direction of travel and consequently the effective downward force produced by the device. Fins extend outwardly from a hollow body and provide attitude stabilization as the device travels through water. A diaphragm arranged within the body defines an internal compartment in which fluid could be transported. Pressure equalization means in the form of vents equalize the pressure between the interior and exterior of the body thereby eliminating external static pressure considerations from the structural design and consequently allowing the device to travel at the desired depth.

12 Claims, 10 Drawing Figures

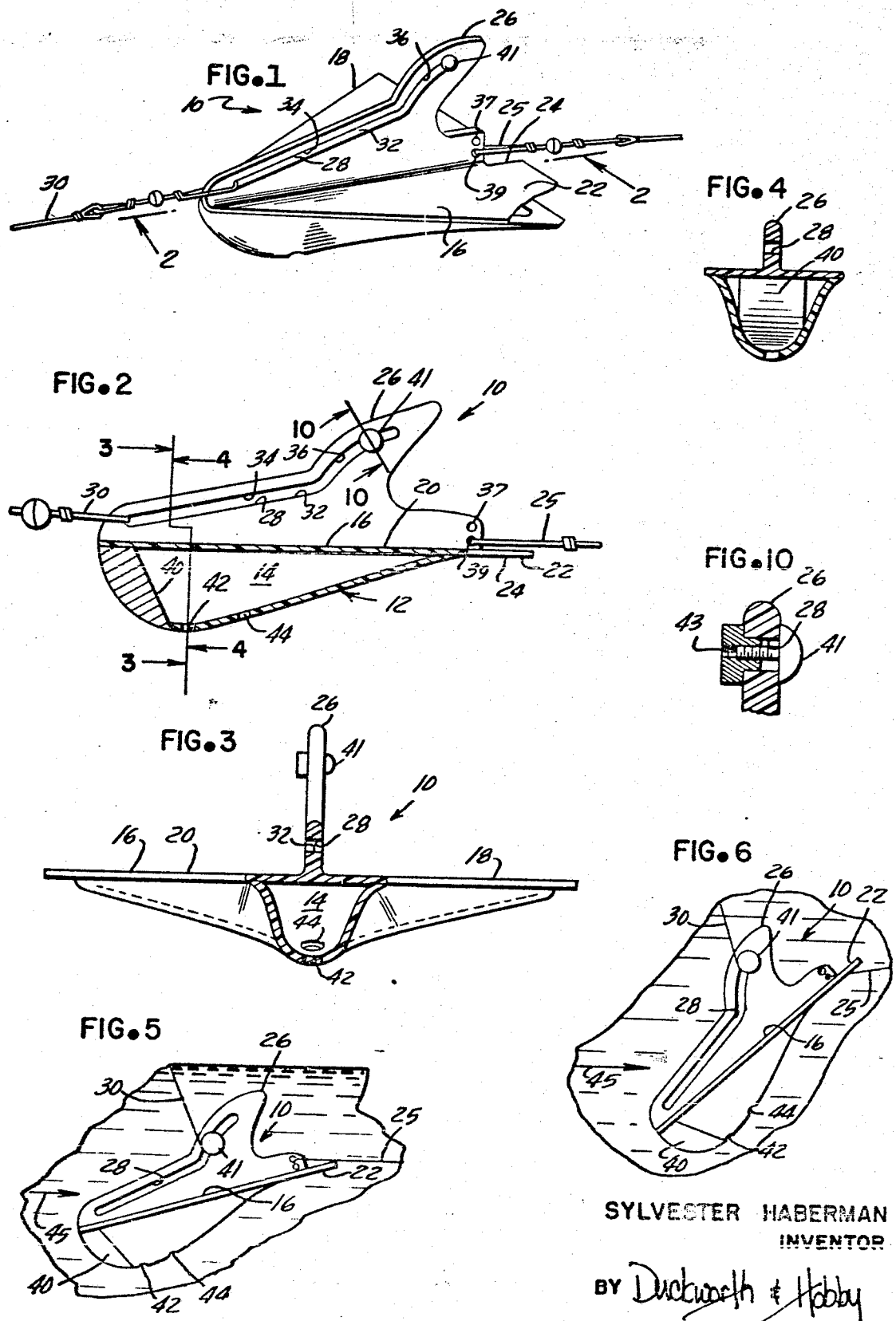

PATENTED FEB 29 1972 3,645,224

SYLVESTER HABERMAN
INVENTOR

BY Duckworth & Hobby

ATTY'S

UNDERWATER PLANING DEVICE

BACKGROUND OF THE INVENTION

1. Field of the Invention

The subject invention is related to planing devices or the like designed to be towed from a conventional water craft by means of a towline wherein the device being towed is capable of travelling at a plurality of depths for the purpose of maintaining fishing tackle at a desired depth during trolling. Planing devices of this type may be also specifically designed to be used as under water carriers having material storing facilities for transporting any desired material from one point to another.

2. Description of the Prior Art

The general concept of planers or like devices that travel at predetermined depths underneath the surface of the water by means of being towed from a self powered water craft is generally known in the prior art. Devices of this nature have been used for maintaining fishing tackle submerged during trolling. Similar devices have also been used on a larger scale for transporting materials underwater. However, many known planers or depth control devices whether used as fishing tackle or underwater transporters have suffered from a plurality of common problems such as a lack of stability during travel and inadequate control both as to depth and direction of movement. More specifically it was often impossible to efficiently control the depth of travel, particularly of the planing devices used as part of fishing tackle in that the depth could not be readily changed while the device was in use. Due to this lack of control of the prior art planing devices it was often impossible to use more than one at any given time due to the likelihood of the devices become entangled.

With regard to the depth control devices used as transporters or instrument platforms the lack of stability and control would severely limit the speed and consequently the effectiveness of transporters and therefore would obviously render them useless as efficient transportation or scientific investigation apparatus. Similarly, as in planing devices used as fishing tackle, underwater transporters presently known include the problem of efficiently regulating the depth at which the device travels.

SUMMARY OF THE INVENTION

Accordingly, the present invention is directed towards a device to be towed behind a conventional water craft or the like and which is capable of traveling either on top or preferably below the surface of the water at any of a plurality of depths wherein the device may be used as a depth control device for regulating the depth of fishing tackle during trolling. Alternatively, on a large scale, the device may be used as a transporter for various types of cargo which may be stored within the body of the device thereby eliminating the problem of surface traveling water craft.

More specifically the device of the present invention comprises a body having a hollow interior which cooperates with a pressure equalizing means in the form of a plurality of holes or vents. The arrangement or positioning of the holes allows water to pass into the interior of the body thereby forcing out a certain amount of air within the body until pressure equalization occurs between the interior and exterior of the body. The amount of water entering the body controls the device's overall specific gravity. The effective downward force of the device is determined upon the angular orientation or angle of attack of the device relative to the direction of travel when the device is under tow. Accordingly, attitude stabilization means are attached to the body in the form of an aft extending deck area which comprises elevons located aft of the delta wing configurations. The stabilization means also includes a fin extending along the longitudinal axis of the body and arranged in a plane substantially perpendicular to the laterally extending deck.

As explained above, the device is propelled through the water by being towed from any type of self powered vehicle by means of a tow line which is adjustably attached to the device along a cam surface formed on the stabilizing fin. Accordingly, it is one aspect of the present invention to provide means for readily establishing and/or changing the depth at which the device travels through water. More specifically the attach point or point at which the tow line is attached to the device along the cam surface establishes the angular orientation of the device relative to the forward direction of travel. The camming surface may be provided in the form of a groove in the stabilization fin which is arranged such that the device is forced to travel at a predetermined angular orientation relative to the forward direction of travel due to the force of water against the device. The angular orientation in turn determines the downward force which the device will maintain during travel. Accordingly, by adjusting the position of the attach point along the cam surface, the angular orientation and consequently the depth may be readily regulated. After a fish has been hooked and the lure attachment line is in the lower of two attach hole, the position of the attach point may be selectively adjusted from the towing vehicle by providing an amount of slack in the tow line which in turn causes the attach point to move along the cam surface. The attach point may also be automatically repositioned by means of force being applied to the lure attachment line when located in the upper of the two attachment holes of the device when the device is used as fishing tackle and a fish is hooked. This causes the attach point to move to the frontmost extremity of the cam surface thereby causing the device to rise to the surface.

A larger scale of the device of the subject invention may be used as an underwater transporter by mounting within the interior of the body portion a flexible diaphragm serving to define or separate a material storing compartment from the area of the body interior communicating with the exterior of the device. More specifically, a flexible diaphragm may be mounted within the interior of the body such that the diaphragm conforms to the inner surface of the interior but is flexible enough to allow any pressure equalizing means, which may be in the form of vents or air and water valves, to equalize the pressure on the interior and exterior of the device. During towing the interior of the transporter will therefore contain the material being transported in one compartment defined by the diaphragm and the remaining portion of the interior will contain the requisite amount of water necessary to establish the required buoyancy and equalize the pressures on the interior and exterior of the device. Proper venting means are provided in the form of a vent and fill valve communicating with the material carrying compartment and a water valve communicating with the remaining portion of the body interior separated from the material storage compartment by the diaphragm. These valves are provided for pressure equalization and buoyancy control as described above and for the filling and emptying of the material carrying compartment within the interior of the body.

BRIEF DESCRIPTION OF THE DRAWINGS

Other objects, features and advantages of this invention will be apparent from a study of the written description and the drawings, in which:

FIG. 1 is a perspective view having a partially broken away section showing the interior of one embodiment of the present invention;

FIG. 2 is a partial sectional view of one embodiment of the present invention;

FIGS. 3 and 4 are sectional views taken along lines 3—3 and 4—4 respectively of FIG. 2;

FIGS. 5 and 6 are side views of one embodiment of the present invention showing various angular orientations to the forward direction of travel of the device;

FIG. 10 is a detailed sectional view of the lock means of the embodiment of FIGS. 1-6.

DETAILED DESCRIPTION OF THE EMBODIMENT

Figure 8:
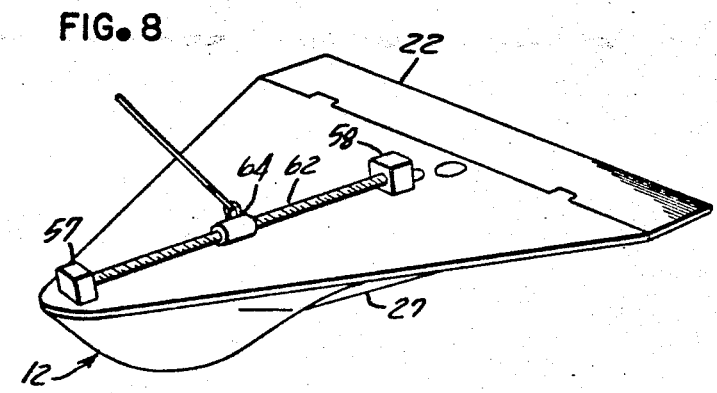
FIG. 8 is a perspective view of the embodiment of FIG. 7.

FIG. 1 discloses one embodiment of the present invention in the form of a planing device generally indicated at 10 and capable of being utilized as a dynamic sinker, designed to maintain fishing tackle such as lures, or the like, at a desired depth during trolling. The planing device 10 comprises a main body 12 having a hollow interior 14 (FIGS. 2, 3 and 4). Attached to the body or integral with it is wings 16 and 18 which extend laterally outward from body 12 as shown in FIG. 1. The wings 16 and 18 comprise the upper portions of deck 20 which essentially serves as a top surface of the interior 14 of the body. Deck 20 further includes aft stabilization fins or elevons 22 which, as shown in FIGS. 1 and 2, may be connected to the deck 20 in substantially the same plane. A cutaway portion 24 is provided in the approximate center of aft stabilization wings or elevons 22 in order to eliminate interference between the elevons 22 and a line 25 connecting the fishing tackle or lure (not shown) to the rear of the device. The lure attachment line 25 may be located in either the upper or lower of two attach holes 37 or 39 respectively. As briefly explained above the position or attach point of the line 25 to the device determines the amount of force on the lure (not shown) required to surface the device. More specifically, the cam surface geometry in relation to lure attach point determines the "hooking power" of the device or the force required at the aft lure attach point to cause the tow line attach point to slide to the forward position.

Viewing the physical orientation of the embodiment of the present invention as shown in FIG. 1, the stabilization means further includes a vertical stabilization fin 26 extending along the longitudinal center of the device and arranged in a plane substantially perpendicular to the deck 20 including wings 16 and 18. Fin 26 may extend substantially the length of the device and accordingly has formed thereon a cammed surface 28 which serves as means for attaching the towline 30 to the device in such a manner that the attach point or point at which the towline 30 is attached to the device may be readily adjustable. Cam surface 28 may be in the form of a slot or a groove generally indicated at 32 and including two portions 34 and 36 which are arranged at a similar angular relation to one another. The first cam surface portion 34 is substantially linear and extends toward the front or bow portion of the device as shown in FIG. 1. The second portion of the cam surface 36 has a curved arcuate configuration and extends generally towards the aft or rear of the device as pictured in FIG. 1.

As it is clearly shown towline 30 is free to travel along the slot 32 defining cam surface 28 including both portions 34 and 36. However, the attach point or point at which the tow line 30 engages the cam surface 28 determines the angular orientation of the device 10 to the forward direction of travel of the device. Different angular orientations are represented in FIGS. 5 and 6. The angular orientation is established due to both the physical configuration and positioning of cam surface 28 on the stabilization fin 26. It is important to note that the attach point of towline 30 with cam surface 28 must be along the curved portion 36 if the device 10 is to form an angular orientation and consequently to travel beneath surface. If the attach point travels along the linear portion 34 of the cam surface 28 the attach point will travel to the frontmost extremity 38 of slot portion 34. This substantially eliminates an angular orientation of the longitudinal axis of the device relative to the forward direction of travel which forces the device to the surface of the water while being towed. A stop means 41 pictured in the form of a lockscrew may be mounted in the curved portion 36 of the cam surface 28 by means of an inter locknut 43. The stop means 41 is provided to limit or stop the travel of towline 30 beyond the point at which the stop means 41 is mounted in the curved portion. This of course has the effect of restricting the device from establishing certain angular orientation in that the towline and consequently the attach point may be prohibited from being positioned in the upper part or any desired part of the curved portion 36 of cam surface 28.

FIGS. 2, 3 and 4 show various sectional views of the interior portion 14 of the body 12. A ballast means in the form of weight or the like 40 may be inserted in the bow or front portion of the device as shown in FIGS. 2 and 4. As pictured the ballast may provide a slight angular orientation or nose down position when the device is freely floating in the water.

Pressure equalization in the form of vents 42 and 44 are arranged in the bottom portion of body 12 along the longitudinal center of the device in a spaced relation to one another as clearly shown in FIG. 2. These vents or apertures cooperate in a working relation with one another to equalize the internal and external pressures of the device by allowing water to pass in through vent 42 and similarly allow the air within the interior or 14 to pass out through vent 44. The amount of water allowed to pass in through vent 42 is a function of the external water pressure on the device at the operational depth of the device. Accordingly when the internal and external pressures of the device are equalized, a certain amount of air will remain within the interior 14 of body 12 and this remaining air will be pressurized to equal the exterior water pressure.

In regard to FIGS. 5, 6 and 10 the planing device of the subject invention is pictured at various angular orientations and consequently traveling at various depths as established by the position of the attach point of towline 30 on cam surface 28. More specifically, FIG. 5 shows the device 10 traveling through water in a forward direction by means of towline 30, wherein the longitudinal axis of the device is oriented at an angle of approximately 15° to the horizontal represented by water force vector 45, as shown. Similarly, FIG. 6 represents an angular orientation of approximately 30°, as shown. It should be noted that the difference in angular orientation is dependent upon the placement of the attach point of towline 30 on curved portion 36 of cam surface 28 as determined by stop member 41. Furthermore line 30 is positioned during travel at an angle of approximately 80° to the horizontal which demonstrates the high lift to drag ratio of the device.

Figure 7:
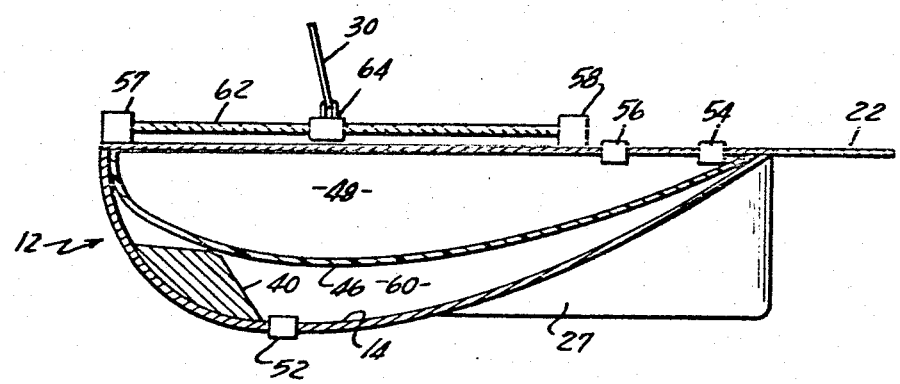
FIG. 7 is a side view of another embodiment of the present invention showing a partial section.
Figure 9:
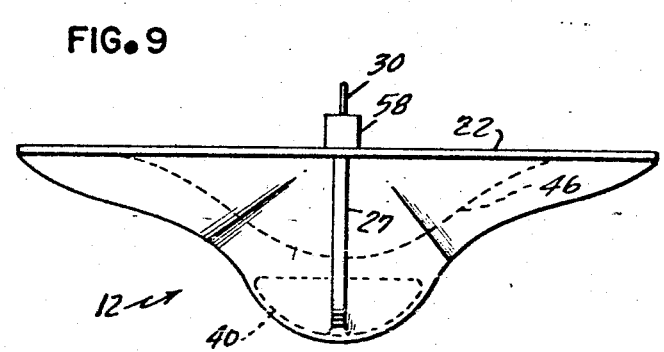
FIG. 9 is a rear view of the embodiment of FIG. 7.

The embodiment shown in FIGS. 7, 8 and 9 is directed toward a larger structure than that shown in FIGS. 1–6, which is primarily designed to serve as an underwater transporter. More specifically, the embodiments of FIG. 7 and FIG. 2 differ primarily in the size of the individual structure in that the basic structural elements such as the body, body interior and stabilization means are essentially the same in both embodiments. As featured in FIG. 7 the interior 14 of the body 12 has mounted therein a flexible diaphragm which may be any member made from a satisfactory material compatible with the cargo being carried. The diaphragm 46 is designed to cooperate with the configuration of the interior 14 while at the same time maintaining a cargo carrying compartment 48 in isolated relation from the remaining portion 60 located beneath the diaphragm and cooperating with pressure equalization means. These pressure equalization means differ from the embodiment as shown in FIG. 1 in that a water valve 52 and air valve 54 are arranged to communicate with interior areas 60 and 48 respectively so as to equalize the internal and external pressure of the interior 14 and admit sufficient water to obtain the desired buoyancy of the vehicle. This is accomplished by admitting water to interior portion 60 while at the same time forcing air out through valve 54 in a similar fashion as described with reference to the embodiment shown in FIG. 1. A drain and fill valve 56 is designed to communicate with the cargo carrying compartment 48 and serves as means to fill and empty the compartment as desired.

As further shown in FIGS. 7, 8 and 9, elevons 22 are arranged in essentially one same location and perform one same function as in the embodiment of FIGS. 1–5. However, fin 27 arranged underneath the device is designed to provide attitude stability and may be substituted for fin 26 in one embodiment of FIGS. 1–6. The fin 27 is mounted as shown in order to accomplish more efficient stabilization than fin 26 when the device is traveling on top of the surface.

Additional structural elements as shown in FIGS. 7–9 include means in the form of an adjusting screw 62 mounted on body 12 at 57 and 58. As can be seen towline 30 is movable, and adjustably attached at movable connection point 64 designed to travel along screw 62. The transporter embodiment of FIGS. 7–9 could include means for the introduction of air into the transporter either from internal compressed air tanks or surface pumps for the purpose of forcing out the water that was admitted initially to allow the transporter to submerge without departing from the spirit and scope of the present invention.

This invention is not to be construed as limited to the particular forms disclosed herein, since these are to be regarded as illustrative rather than restrictive.

I claim:

1. A device of the type designed to travel through water in a towed fashion, said device comprising:
   a. a body including a hollow interior portion;
   b. attitude stabilizing means fixedly attached to said body and including a deck portion extending laterally outward from said body;
   c. means on said stabilizing means to adjustably position an attach point of a tow line attached to said device at predetermined positions along said deck portion, wherein the depth at which said device travels is thereby determined;
   d. pressure equalizing means positioned in communicating relation with said hollow interior portion of said body, whereby fluid is allowed to pass into and out of said body interior in such a manner as to equalize the interior and exterior pressures on said body; and
   e. said pressure equalizing means including at least two holes arranged in communicating relation with said interior of said body in spaced relation to one another, whereby water passes into the interior of said body through one of said holes and air passes out of said interior through the other of said holes until the pressure inside and outside the body is equalized.

2. A device as in claim 1 wherein said means to position said attach point comprises: a cam surface arranged on said stabilizing means along the longitudinal center of said body, whereby the position of said attach point along said surface determines the angular orientation of said body relative to the direction of travel of said device through water.

3. A device as in claim 2 wherein said cam surface includes a substantially curved portion and a substantially linear portion, said curved portion arranged relative to said body such that positioning of said attach point on said curved portion establishes an angular orientation of said device to the direction of travel of said device.

4. A device as in claim 2 wherein said attitude stabilizing means further includes at least one fin extending generally parallel to the longitudinal axis of said body; said cam surface being arranged on said fin such that a towline attached to said device is free to travel along said cam surface.

5. A device as in claim 1 wherein said attitude stabilizing means further includes at least one fin extending long a direction substantially parallel to the longitudinal axis of said body; said means to position said attach point comprising an elongated slot disposed on said fin; said slot comprising a first portion extending toward the front of the device and a second portion disposed at an angular relation to said first portion and extending toward the rear of the device; whereby the position of said attach point along either said first or second portion determines the attitude of said device relative to the direction of travel of said device.

6. A device as in claim 5 wherein said second portion has a curved configuration such that the position of said attach point along said curved portion establishes an angular orientation of said device relative to the direction of travel.

7. A device as in claim 5 further comprising a stop means mounted on said second portion so as to prohibit the attach point from being positioned on a predetermined area of said second portion.

8. A device as in claim 1 further comprising means mounted within said interior to define at least one fluid carrying compartment within said interior, said compartment arranged in substantially isolated relation to said pressure equalizing means.

9. A device as in claim 8 wherein said compartment defining means comprises a flexible diaphragm.

10. A device as in claim 1 wherein said means to position said attach point comprises: an adjustable screw attached to said deck, and means to movably attach said towline to said screw.

11. A device of the type designed to travel through water in a towed fashion, said device comprising:
   a. a body including a hollow interior portion;
   b. attitude stabilizing means fixedly connected to said body, including a deck portion extending laterally outward from said body;
   c. means on said deck portion of said body to adjustably position an attach point of a tow line attached to said device, whereby the angular orientation of said device is thereby determined;
   d. means mounted within said hollow interior to define a compartment, whereby material may be stored within said compartment during travel of said device through water;
   e. pressure equalization means arranged in noncommunicating relation with said compartment, whereby pressure on the exterior and interior of said body may be equalized to allow submersion of said device;
   f. said pressure equalization means comprising a valve means disposed in communicating relation to a portion of said interior separated from said compartment by said compartment defining means; and
   g. said valve means comprising an air valve located in the approximate stern of said body and a water inlet valve positioned in front of said interior portion separated from said compartment.

12. A device as in claim 11 wherein said compartment defining means comprises a flexible diaphragm generally conformable to the interior surface area and positioned to substantially isolate said compartment from said pressure equalizing means.

* * * * *